(12) United States Patent
Manneschi (10) Patent No.: US 12,085,688 B2
(45) Date of Patent: Sep. 10, 2024

(54) DUAL DETECTOR WITH TRANSVERSE COILS

(71) Applicant: Alessandro Manneschi, Arezzo (IT)

(72) Inventor: Alessandro Manneschi, Arezzo (IT)

( * ) Notice: Subject to any disclaimer, the term of this patent is extended or adjusted under 35 U.S.C. 154(b) by 474 days.

(21) Appl. No.: 16/772,330

(22) PCT Filed: Dec. 14, 2018

(86) PCT No.: PCT/EP2018/085038
§ 371 (c)(1),
(2) Date: Jun. 12, 2020

(87) PCT Pub. No.: WO2019/115798
PCT Pub. Date: Jun. 20, 2019

(65) Prior Publication Data
US 2021/0080608 A1 Mar. 18, 2021

(30) Foreign Application Priority Data
Dec. 15, 2017 (FR) ...................................... 1762289

(51) Int. Cl.
| | | |
|---|---|---|
| *G01V 3/10* | (2006.01) |
| *G01S 13/87* | (2006.01) |
| *G01S 13/88* | (2006.01) |
| *H04B 5/24* | (2024.01) |
| *H04B 5/73* | (2024.01) |

(52) U.S. Cl.
CPC ............ *G01V 3/105* (2013.01); *G01S 13/878* (2013.01); *G01S 13/885* (2013.01); *G01S 13/887* (2013.01); *H04B 5/24* (2024.01); *H04B 5/73* (2024.01)

(58) Field of Classification Search
CPC ..... G01V 3/105; G01S 13/878; G01S 13/885; G01S 13/887; H04B 5/0043; H04B 5/0075
USPC ......................................................... 324/329
See application file for complete search history.

(56) References Cited

U.S. PATENT DOCUMENTS 3,758,849 A * 9/1973 Susman ................. G08B 13/24
324/225
5,119,028 A 6/1992 Mooney et al.
(Continued)

FOREIGN PATENT DOCUMENTS

| JP | H0933194 A | 2/1997 |
| JP | 2012-527603 A | 11/2012 |

(Continued)

OTHER PUBLICATIONS

French Search Report for Application No. 1762289 dated Sep. 13, 2018, 2 pages.
(Continued)

*Primary Examiner* — Nuzhat Pervin
(74) *Attorney, Agent, or Firm* — Lerner David LLP (57) ABSTRACT

A dual detector includes a detection head having a platform and an inductive sensor that is mounted on the platform and includes a transmitter coil and a separate receiver coil. The transmitter coil and the receiver coil each form a loop, the loop of the transmitter coil at least partially overlapping the loop of the receiver coil so as to form a coupling region that is elongate in a first longitudinal direction defining a first axis, the arm extending on a plane that runs perpendicularly to the platform, and the first axis of the coupling region running transversely to the plane.

19 Claims, 12 Drawing Sheets

(56) References Cited

U.S. PATENT DOCUMENTS

| | | | | |
|---|---|---|---|---|
| 5,148,151 | A | * | 9/1992 | Podhrasky ............... G01V 3/15 340/691.6 |
| 5,214,378 | A | * | 5/1993 | Hore .................... G01D 5/2013 324/207.16 |
| 5,323,114 | A | * | 6/1994 | Nagamune .......... G01S 13/0209 324/334 |
| 5,844,140 | A | * | 12/1998 | Seale ................. G01N 29/2456 73/620 |
| 6,951,133 | B2 | * | 10/2005 | Passarelli, Jr. ....... G01N 29/223 73/622 |
| 7,336,078 | B1 | * | 2/2008 | Merewether ............. G01V 3/15 324/67 |
| 7,550,734 | B1 | * | 6/2009 | Lee ...................... H01S 5/0604 250/370.12 |
| 7,733,077 | B1 | * | 6/2010 | Merewether ............. G01V 3/08 324/67 |
| 8,072,310 | B1 | * | 12/2011 | Everhart .................. H04B 5/45 73/862.41 |
| 8,269,479 | B2 | * | 9/2012 | Krapf ...................... H01Q 9/28 324/67 |
| 9,703,002 | B1 | * | 7/2017 | Olsson ..................... G01V 3/12 |
| 9,733,353 | B1 | * | 8/2017 | Carlson ................... G01S 13/88 |
| 9,835,752 | B2 | * | 12/2017 | Reime ...................... G01V 3/15 |
| 9,997,845 | B2 | * | 6/2018 | Schantz ............. H01Q 21/0087 |
| 10,069,336 | B2 | * | 9/2018 | Fackelmeier ........... B60L 53/66 |
| 10,082,572 | B2 | * | 9/2018 | Duvoisin, III ........ G01S 13/347 |
| 10,587,308 | B2 | * | 3/2020 | Henry ...................... H04B 3/52 |
| 11,238,670 | B2 | * | 2/2022 | Six ............................ G07C 1/24 |
| 2001/0014520 | A1 | * | 8/2001 | Usui ..................... G01N 21/73 438/586 |
| 2003/0205088 | A1 | * | 11/2003 | Passarelli, Jr. ....... G01N 29/223 73/643 |
| 2006/0006874 | A1 | * | 1/2006 | Nelson ................... G01V 3/105 324/327 |
| 2007/0085427 | A1 | * | 4/2007 | Sivasubramaniam ........................ H02K 55/06 310/52 |
| 2009/0174396 | A1 | * | 7/2009 | Howard ............... G01D 5/2053 324/207.24 |
| 2011/0148392 | A1 | * | 6/2011 | Krapf ....................... H01Q 9/28 324/67 |
| 2012/0092206 | A1 | * | 4/2012 | Etebari .................. G01V 3/101 29/601 |
| 2012/0280849 | A1 | * | 11/2012 | Chang ...................... G01V 3/12 342/22 |
| 2013/0113648 | A1 | | 5/2013 | Duvoisin, III et al. |
| 2013/0113649 | A1 | * | 5/2013 | Trishaun ................ G01S 7/026 342/22 |
| 2013/0154649 | A1 | * | 6/2013 | Candy ..................... G01V 3/107 324/329 |
| 2014/0111208 | A1 | * | 4/2014 | Olsson ..................... G01V 3/10 324/329 |
| 2014/0139210 | A1 | * | 5/2014 | Walsh ...................... G01V 3/10 324/239 |
| 2014/0145704 | A1 | * | 5/2014 | Krapf ...................... G01V 3/10 324/67 |
| 2014/0191750 | A1 | | 7/2014 | Reime |
| 2014/0270051 | A1 | * | 9/2014 | Smithanik ........... A61B 6/4435 378/197 |
| 2015/0369910 | A1 | * | 12/2015 | Griebeler ............. G01S 13/106 342/175 |
| 2016/0012966 | A1 | * | 1/2016 | Davis ...................... H02J 50/12 307/104 |
| 2016/0259047 | A1 | * | 9/2016 | Blech .................... G01S 13/887 |
| 2016/0322852 | A1 | * | 11/2016 | Yeh ............................ H04B 5/79 |
| 2017/0060291 | A1 | * | 3/2017 | Chevrier ................. H03K 17/96 |
| 2017/0115424 | A1 | * | 4/2017 | Olsson ..................... G01V 3/10 |
| 2017/0222321 | A1 | * | 8/2017 | Caratelli ............. H01Q 9/0485 |
| 2018/0011212 | A1 | * | 1/2018 | Kang ....................... G01V 3/12 |
| 2018/0164429 | A1 | * | 6/2018 | Tasovac ................ G01S 13/878 |
| 2020/0055417 | A1 | * | 2/2020 | Pachler .................. B60M 7/003 |
| 2020/0408893 | A1 | * | 12/2020 | Wang ...................... G01S 7/354 |

FOREIGN PATENT DOCUMENTS

| | | | | |
|---|---|---|---|---|
| JP | 2014-527628 A | | 10/2014 | |
| WO | WO-2006082334 A1 | * | 8/2006 | ........ G01N 27/9046 |
| WO | WO-2012024133 A2 | * | 2/2021 | ............ G01V 3/101 |

OTHER PUBLICATIONS

International Search Report for Application No. PCT/EP2018/085038 mailed Jan. 29, 2019, 2 pages.

* cited by examiner

DUAL DETECTOR WITH TRANSVERSE COILS

CROSS-REFERENCE TO RELATED APPLICATIONS

The present application is a national phase entry under 35 U.S.C. § 371 of International Application No. PCT/EP2018/085038 filed Dec. 14, 2018, which claims priority from French Application No. 1762289, filed Dec. 15, 2017, all of which are incorporated herein by reference.

FIELD OF THE DE INVENTION

The invention relates to the field of the detection of target objects, and more particularly to the detection of explosive charges such as landmines buried in the ground.

TECHNOLOGICAL BACKGROUND

In order to detect explosive charges, it is known to use dual technology detectors ("dual detectors") comprising a detection head housing an inductive sensor and a ground-penetrating radar, insofar as these technologies are complementary as for the types of detected materials (metals for the inductive sensor vs. differences in dielectric constants of the materials and relative position for the radar).

In use, the Applicant has however noticed that the ground was not neutral from an electromagnetic point of view and can therefore disturb the coupling between the windings. In addition, the ground is rarely uniformly magnetic so that, during the scanning of the ground with the detector by an operator, the detected signal can vary only due to the presence of metal debris or to the very composition of the ground, or even trigger false alarms.

In addition, the operators using these detectors may be inadequately trained and may not hold the detector properly or perform an inappropriate scanning motion. The detection head can then form a lateral angle with the ground, so that one of the coils is closer to the ground than the other of the coils, which creates a strong modulation of the signal and therefore risks triggering false alarms. And even if the operator were well trained and tried to keep the detection head substantially parallel to the ground at any point in the scanning motion, he cannot locally modify its inclination to take into account the unevenness in the ground.

In order to overcome these difficulties, manufacturers tend to reduce the sensitivity of these detectors. The risk, however, is that they will no longer be able to detect targets buried in the ground and therefore put the lives of the operators in danger.

Document U.S. Pat. No. 3,758,849 describes a method for detecting a target object using a detector comprising a detection head comprising a inductive sensor comprising a transmitting coil and a receiving coil distinct from each other. The transmitting coil and the receiving coil form a coupling area.

However, the detector is fixed and it is the object to be scanned that moves in front of it along a scanning direction. The detector therefore does not scan the ground. In addition, it is not a dual detector, that is to say a detector comprising an additional detection means in addition to the inductive sensor.

Document U.S. Pat. No. 9,733,353 describes a detector comprising a single detection loop.

Document WO 2012/024133 describes a detector comprising an inductive sensor formed by a receiving coil and a transmitting coil positioned so as to form a through bar and V-shaped radar antennas.

SUMMARY OF THE INVENTION

An object of the invention is therefore to propose a dual detector comprising a detection head housing an inductive sensor and another sensor, such as a ground penetrating radar, which is capable of reducing the false alarms likely to be generated during the scanning of a ground with the detector while having higher sensitivity.

For this, the invention proposes a method for detecting a target object using a dual detector, said detector comprising a detection head comprising an inductive sensor comprising a transmitting coil and a receiving coil distinct from each other, the transmitting coil and the receiving coil each forming a loop, the loop of the transmitting coil at least partially overlapping the loop of the receiving coil so as to form a coupling area, the coupling area being elongated along a first longitudinal direction defining a first axis. The detector is moved along a scanning direction defining a scanning axis and in that, during this movement, the detection head is oriented so that the first axis of the coupling area is substantially parallel to the scanning axis.

According to a second aspect, the invention proposes a dual detector suitable for use in a detection method as described above, said detector comprising a detection head fixed to a handle by means of a mechanical link, the detection head comprising:
  a platform and
  an inductive sensor fixed to the platform and comprising a transmitting coil and a receiving coil distinct from each other, the transmitting coil and the receiving coil each forming a loop, the loop of the transmitting coil at least partially overlapping the loop of the receiving coil so as to form a coupling area, the coupling area being elongated along a first longitudinal direction defining a first axis. Furthermore, the handle extends in a plane normal to the platform and in that the first axis of the coupling area is transverse to said plane.

Some preferred but nonlimiting characteristics of the dual detector described above are the following, taken individually or in combination:
  each loop being substantially elongated along a second longitudinal direction defining a second axis, the first axis and the second axis being substantially parallel.
  the detection head is elongated and extends along the first axis.
  the transmitting coil and the receiving coil comprise wound wires, the transmitting coil having a greater number of turns than the receiving coil.
  the transmitting coil and the receiving coil are printed directly on the platform, the platform then forming a printed circuit.
  the transmitting coil and the receiving coil are homopolar.
  the mechanical link is fixed in rotation about a third axis, said third axis being comprised in the plane.
  the third axis is transverse to the first axis.
  the mechanical link comprises a pivot link, a built-in link or a ball-joint link.

The detector further comprises a grip configured to be grasped by an operator, said grip extending in the plane.

The detector further comprises a ground-penetration radar comprising a transmitting antenna and a receiving antenna, the transmitting antenna and the receiving antenna each being housed in the center of one of the loops of the transmitting and receiving coils.

the transmitting antenna and the receiving antenna of the radar are of one of the following types: quad-ridged horn radio antenna, bow tie antenna, rectangular bow tie antenna, Archimedean spiral antenna, logarithmic spiral antenna, Vivaldi antenna, logarithmic spiral antenna elongated along a fourth axis perpendicular to the first axis.

the transmitting antenna and the receiving antenna are made at least partly of nickel or chromium.

a central portion of the transmitting antenna and of the receiving antenna is made of copper and comprises, on the surface, a protective layer made of gold.

the transmitting antenna and the receiving antenna have a thickness less than one micron, preferably equal to approximately 200 nm.

BRIEF DESCRIPTION OF THE DRAWINGS

Other characteristics, aims and advantages of the present invention will become more apparent upon reading the following detailed description, and in relation to the appended drawings given by way of nonlimiting examples and wherein.

DETAILED DESCRIPTION OF ONE EMBODIMENT

Figure 1:
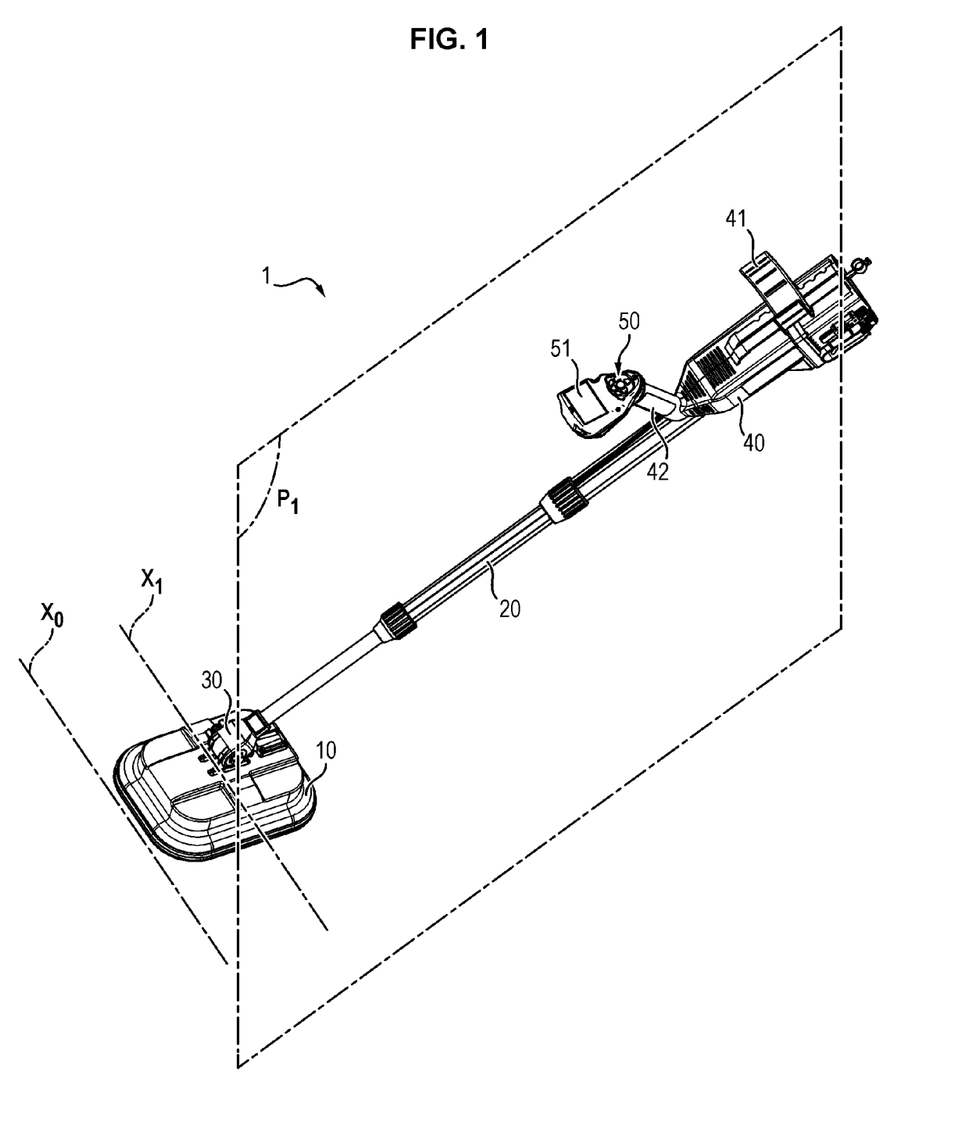
FIG. 1 is a perspective view of an exemplary embodiment of a detector according to the invention.

A dual detector 1 according to the invention comprises a detection head 10 fixed to a handle 20 by means of a mechanical link 30.

The detection head 10 corresponds to the portion intended to come close to the ground in order to detect target products. To this end, it comprises:

a platform 11 an inductive sensor fixed to the platform 11 and comprising a transmitting coil 12 and a receiving coil 13 distinct from each other, and another sensor, preferably a ground-penetration radar.

The transmitting coil 12 and the receiving coil 13 are homopolar windings. In a manner known per se, they are configured to transmit and receive waves having a frequency comprised between 300 Hz and 180 kHz. They each form a loop and are shaped so that the loop of the transmitting coil 12 at least partially overlaps the loop of the receiving coil 13 so as to form a coupling area 14. This configuration allows obtaining an inductive sensor in which mutual inductance is minimal.

By way of comparison, compared to an inductive sensor comprising a single coil constituting the transmitter and the receiver and formed of two loops in series of opposite directions in order to neutralize the effects of external interferences, the use of two distinct coils 12, 13 for the transmitting coil 12 and the receiving coil 13 makes it possible to amplify the signal, and therefore does not require decreasing the detection threshold to avoid the risks of false alarms.

The coupling area is elongated along a first longitudinal direction which defines a first axis $X_1$. In order to further reduce the risks of false alarms and to simultaneously increase the sensitivity of the detector 1, the inductive sensor is positioned so that, in use, the handle 20 extends in a plane $P_1$ normal to the platform 11 on which the transmitting and receiving coils 12, 13 are fixed and the first axis $X_1$ of the coupling area 14 is transverse to said plane $P_1$.

By "transverse" it will be understood here that the first axis $X_1$ forms an angle comprised between 70° and 110° with the plane $P_1$, preferably on the order of 90°. Furthermore, the loop of the transmitting coil 12 and the loop of the receiving coil 13 being of symmetrical shape, the first axis $X_1$ passes through the points 14a, 14b of intersections of the two loops.

By "longitudinal direction" of a part or an element, it will be understood here the direction along which the part or the element has its largest dimension.

Figure 4A:
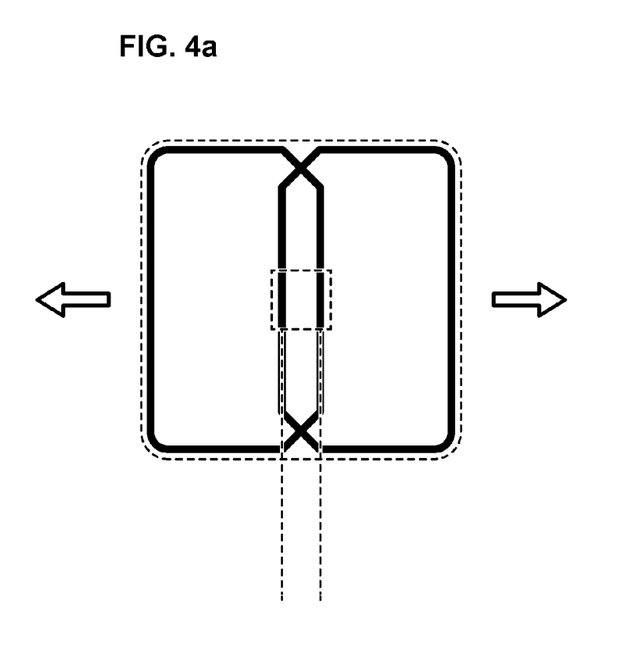
FIG. 4a schematically illustrates the orientation of the transmitting and receiving coils of a traditional detector as a function of the right/left scanning direction.
Figure 4B:
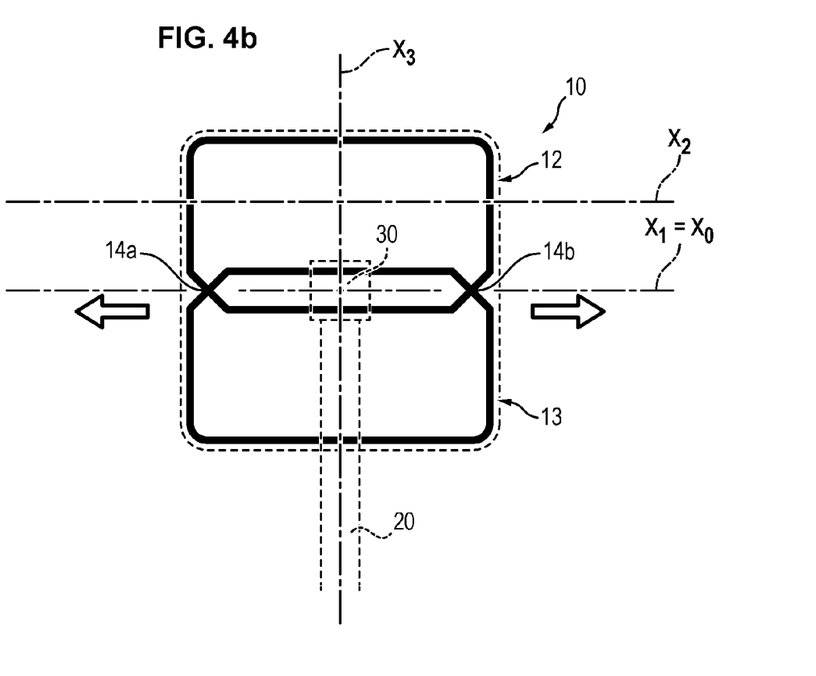
FIG. 4b schematically illustrates the orientation of the transmitting and receiving coils of a detector according to the invention as a function of the right/left scanning direction.
Figure 5A:
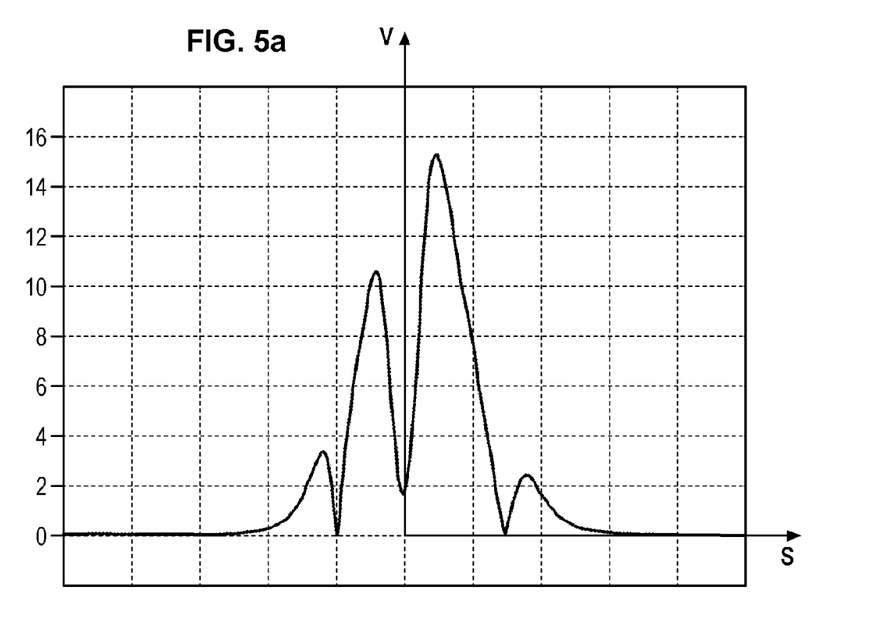
FIGS. 5a and 5b illustrate the amplitude of the signal measured for a traditional detector and a detector according to the invention, respectively, when the detector is in contact with a magnetic ground on which a steel ball has been laid and when the detector follows a right/left scanning motion.
Figure 5B:
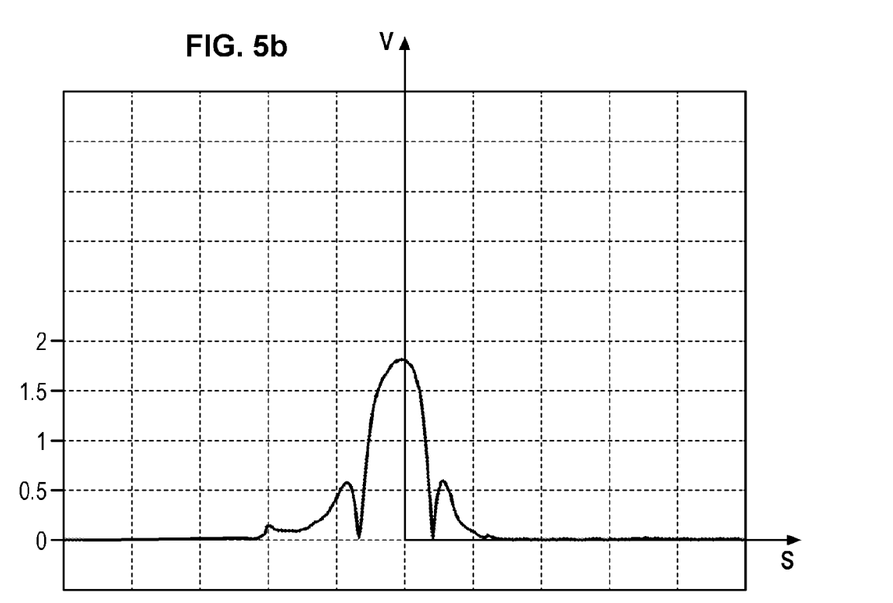
Figure 6A:
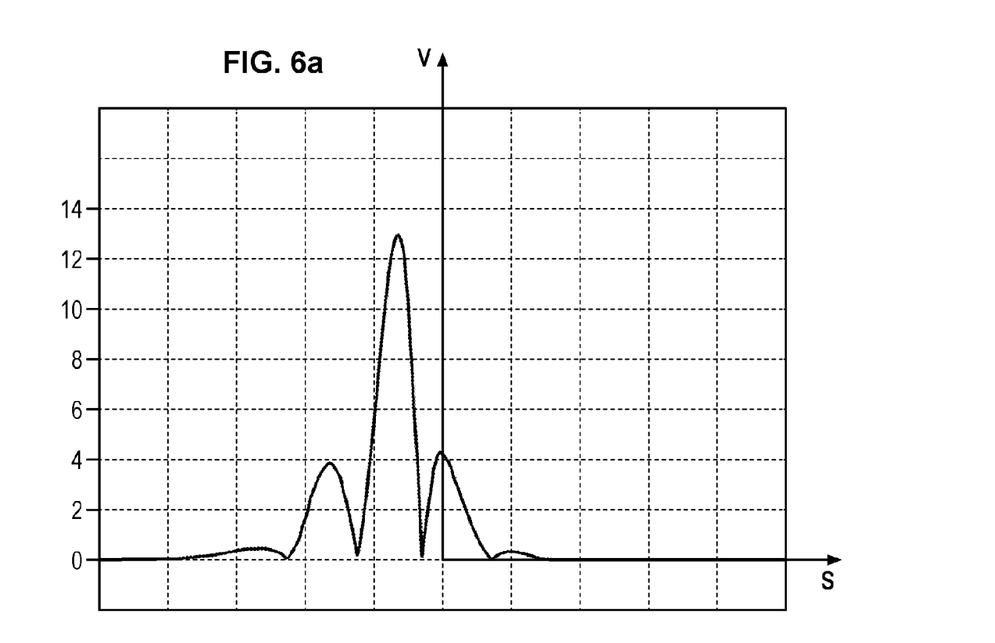
FIGS. 6a and 6b illustrate the amplitude of the signal measured for the traditional detector and the detector according to the invention, respectively, when the detector is in contact with the magnetic ground in which a LI-11 type simulator has been buried and when the detector follows a right/left scanning motion.
Figure 6B:
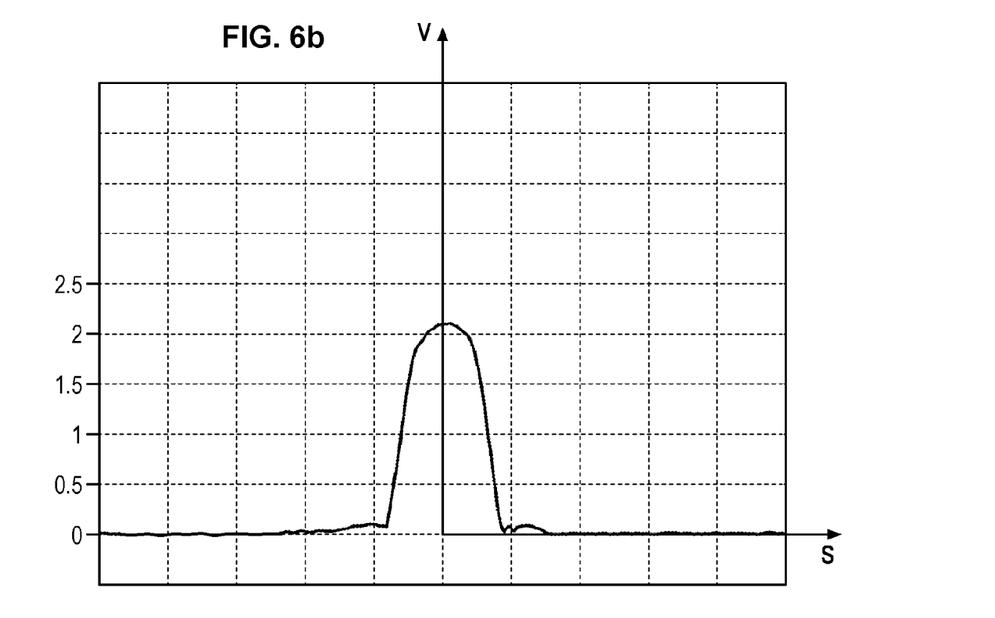
Figure 7A:
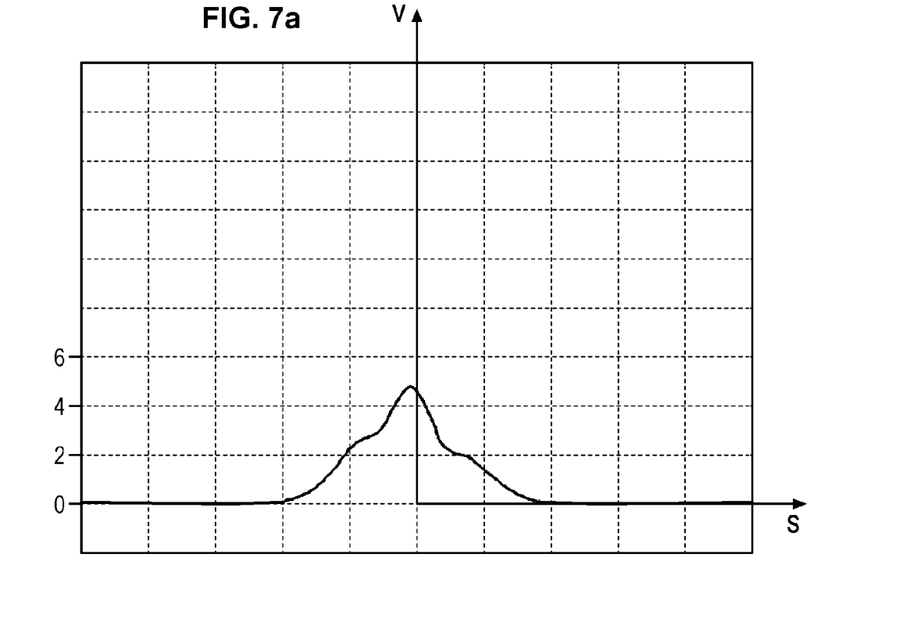
FIGS. 7a and 7b illustrate the amplitude of the signal measured for the traditional detector and the detector according to the invention, respectively, when the detector is in contact with the magnetic ground in which a PMA-2 type simulator has been buried and when the detector follows a right/left scanning motion.
Figure 7B:
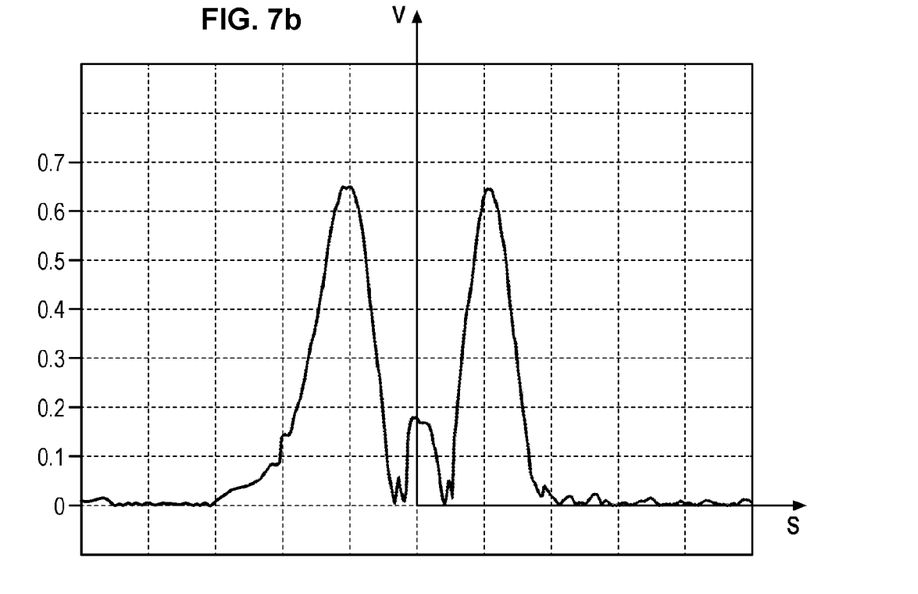
Figure 8A:
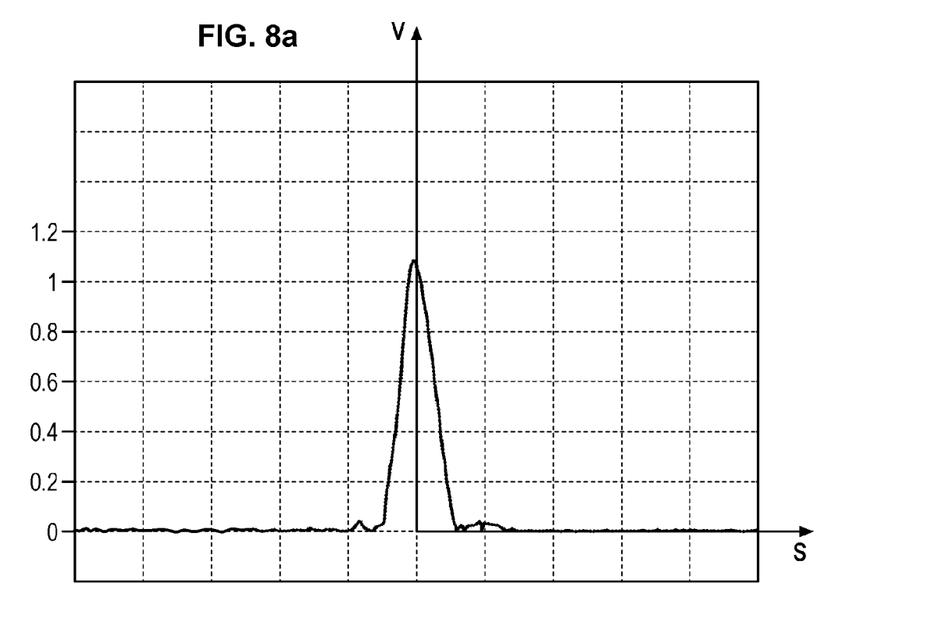
FIGS. 8a and 8b illustrate the amplitude of the signal measured for a traditional detector and a detector according to the invention, respectively, when the detector is 5 cm from the magnetic ground on which a steel ball has been laid and when the detector follows a right/left scanning motion.
Figure 8B:
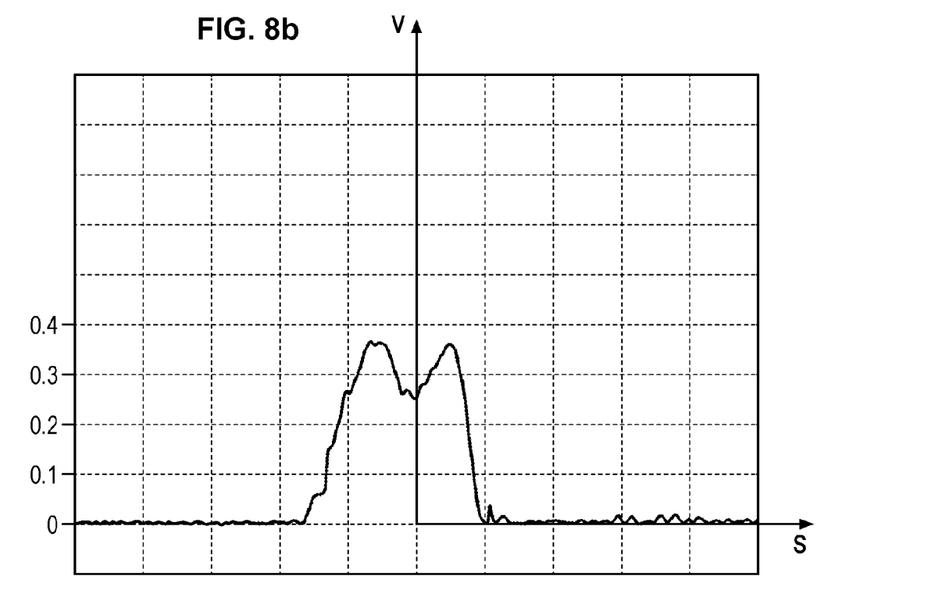
Figure 9A:
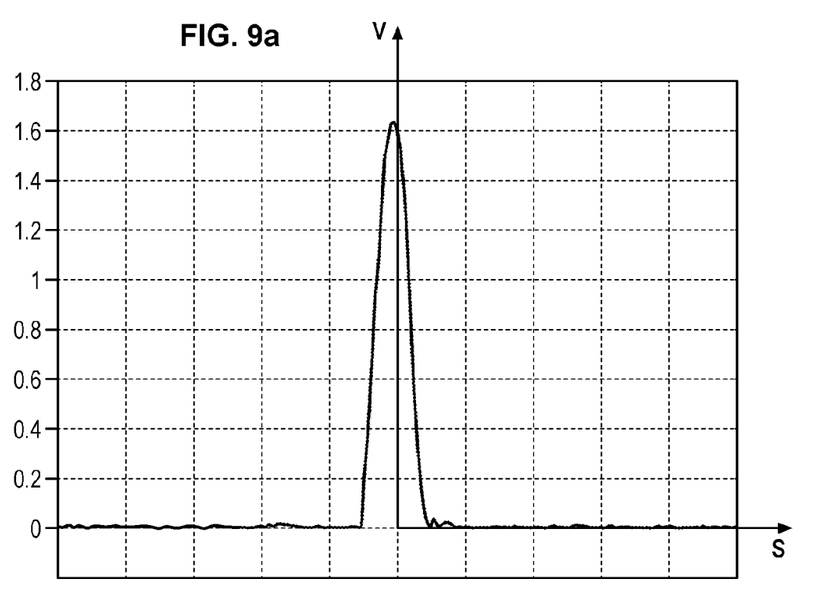
FIGS. 9a and 9b illustrate the amplitude of the signal measured for the traditional detector and the detector according to the invention, respectively, when the detector is at 5 cm from the magnetic ground in which a LI-11 type simulator has been buried and when the detector follows a right/left scanning motion.
Figure 9B:
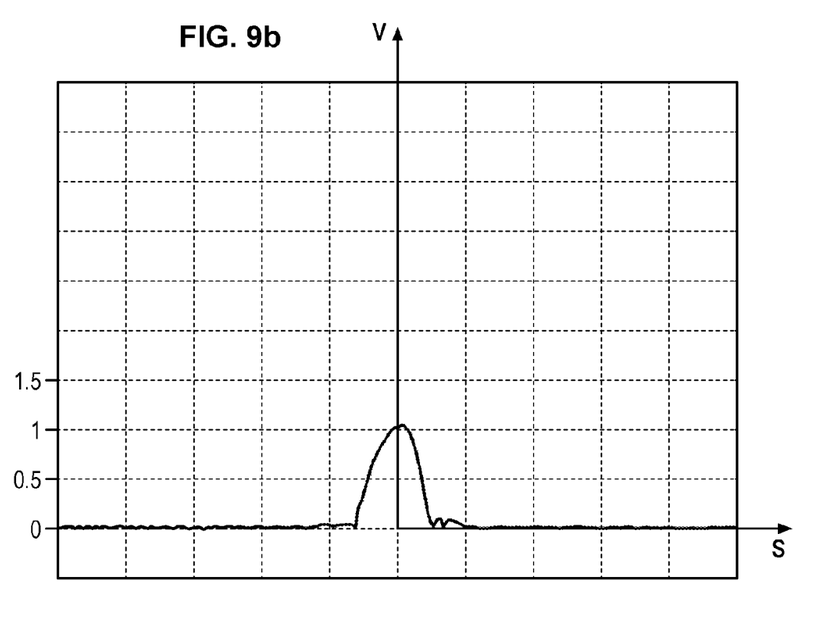
Figure 10A:
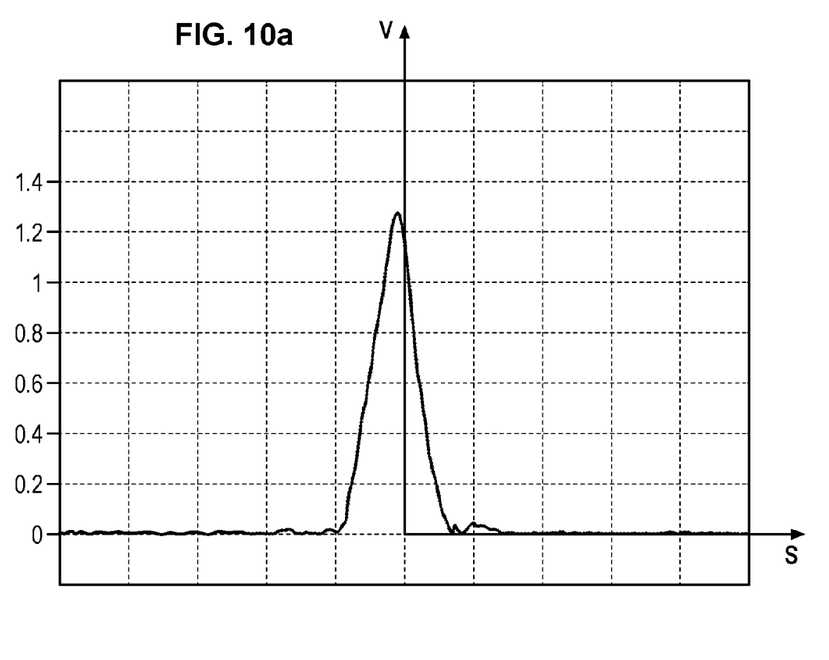
FIGS. 10a and 10b illustrate the amplitude of the signal measured for the traditional detector and the detector according to the invention, respectively, when the detector is at 5 cm from the magnetic ground in which a PMA-2 type simulator has been buried and when the detector follows a right/left scanning motion.
Figure 10B:
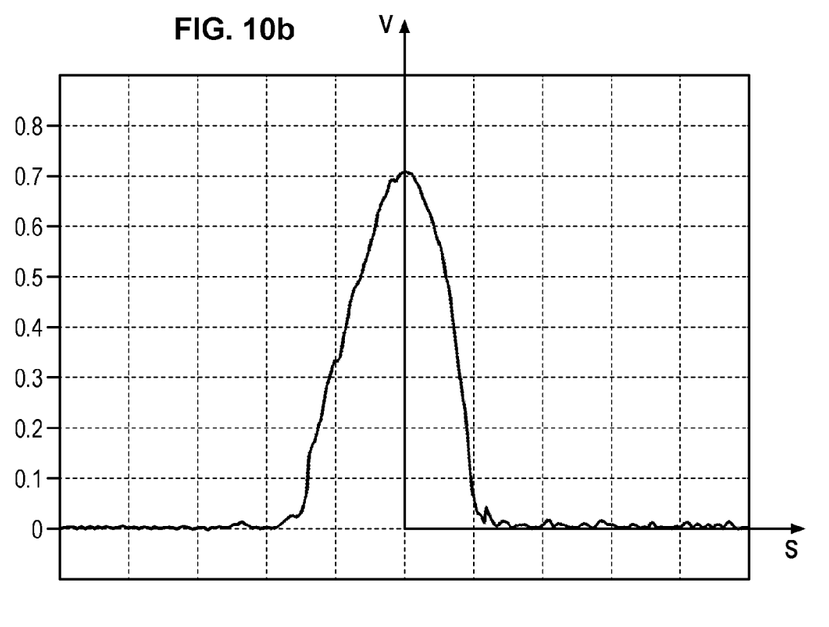
Figure 11A:
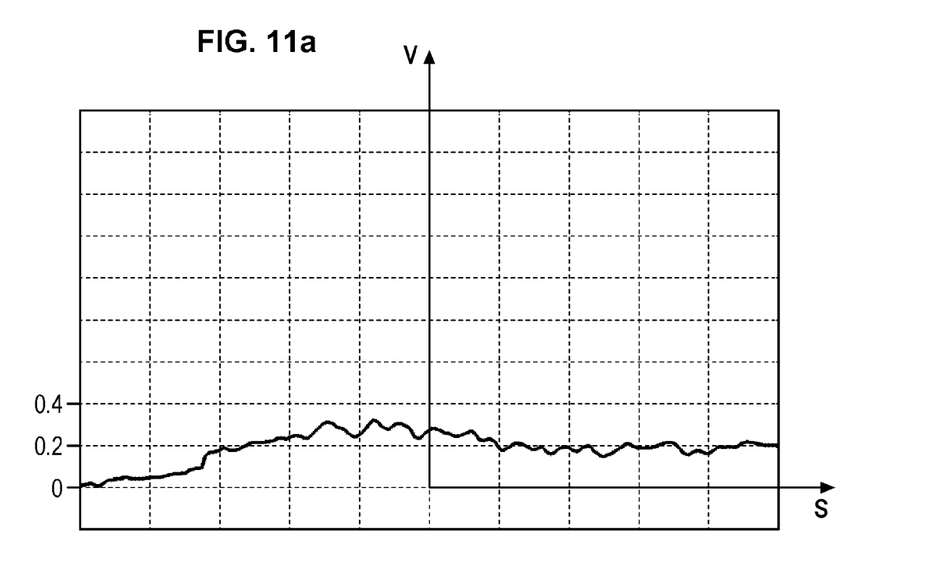
FIGS. 11a and 11b illustrate the amplitude of the signal measured for the traditional detector and the detector according to the invention, respectively, when the detector is at 5 cm from the magnetic ground and when the detector is tilted sideways, statically, by 20°.
Figure 11B:
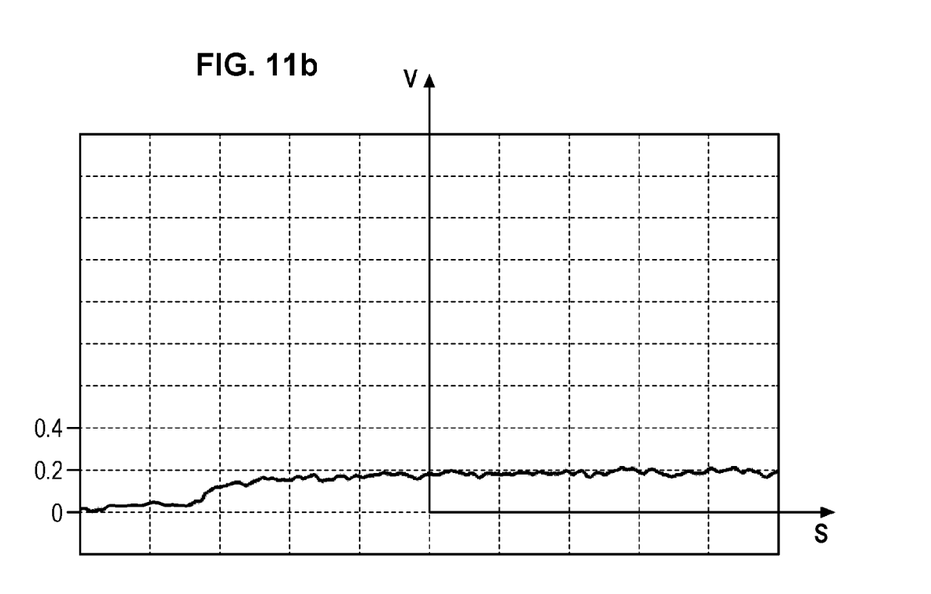

In other words, during the scanning of the ground by an operator, which is done following a right/left scanning motion defining a scanning axis $X_0$, that is to say perpendicular to the direction of advance of the operator, the detection head 10 is oriented so that the coupling area 14 is substantially aligned with the direction of the scanning motion. In this way, at all times, the transmitting coil 12 and the receiving coil 13 are at a substantially equal distance from the ground, even in the event of inclination of the detection head 10 and/or of unevenness in the ground, which significantly reduces the risks of false alarms. In addition, thanks to this new orientation, the metal debris on the ground do not necessarily pass through the coupling area 14, unlike the case of the traditional detector (FIG. 4a) where the coupling area 14 is transverse to the scanning axis $X_0$ and is therefore necessarily crossed.

The loop of the transmitting coil 12 and the loop of the receiving coil 13 are both elongated along a second longitudinal direction which defines a second axis $X_2$. This second axis $X_2$ is substantially parallel to the first axis $X_1$. In other words, the loop of the transmitting coil 12, the coupling area 14 and the loop of the receiving coil 13 have the same longitudinal direction and extend next to each other.

Furthermore, the shape of the detection head 10 is adapted to the configuration and to the spatial orientation of the transmitting and receiving coils 12, 13. It is therefore elongated along the same direction as the loops and extends along a longitudinal direction which is substantially parallel to the first axis $X_1$.

Figure 2:
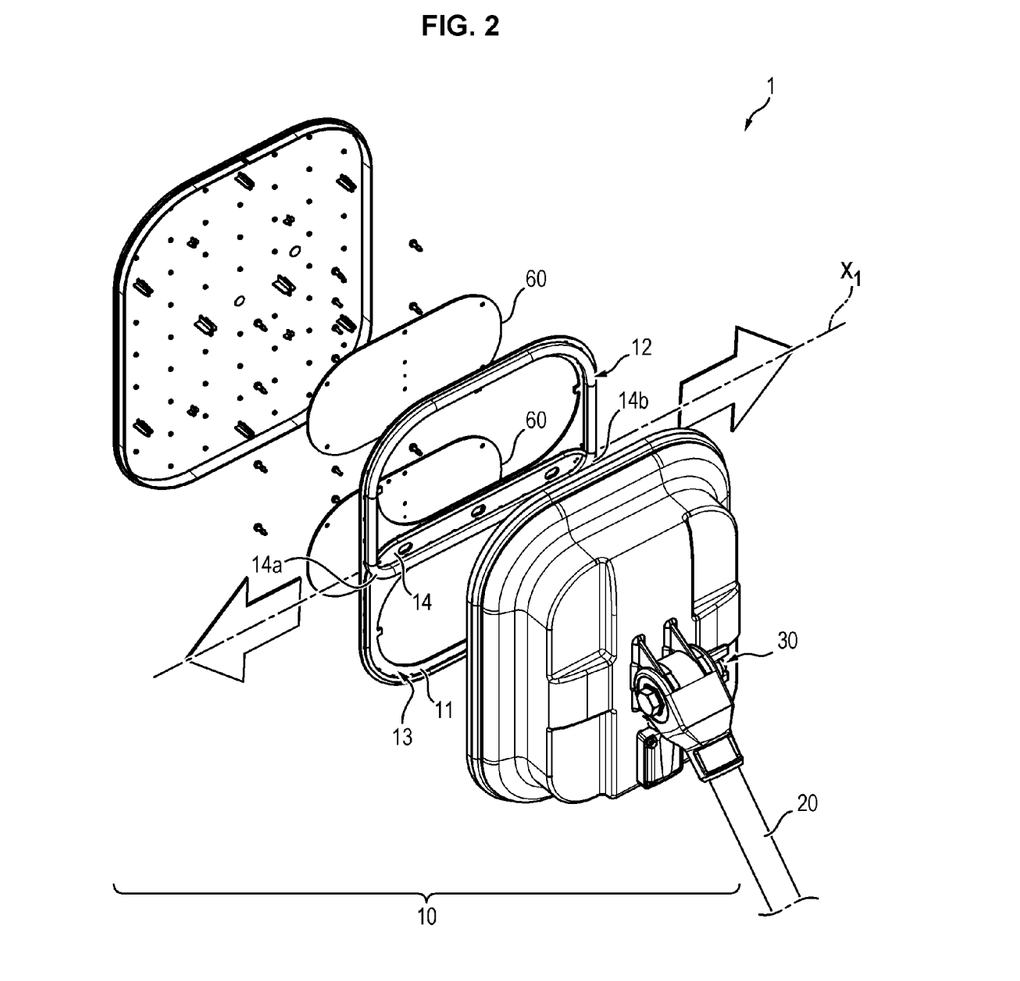
FIG. 2 is an exploded top view in perspective of the detector of FIG. 1.
Figure 3:
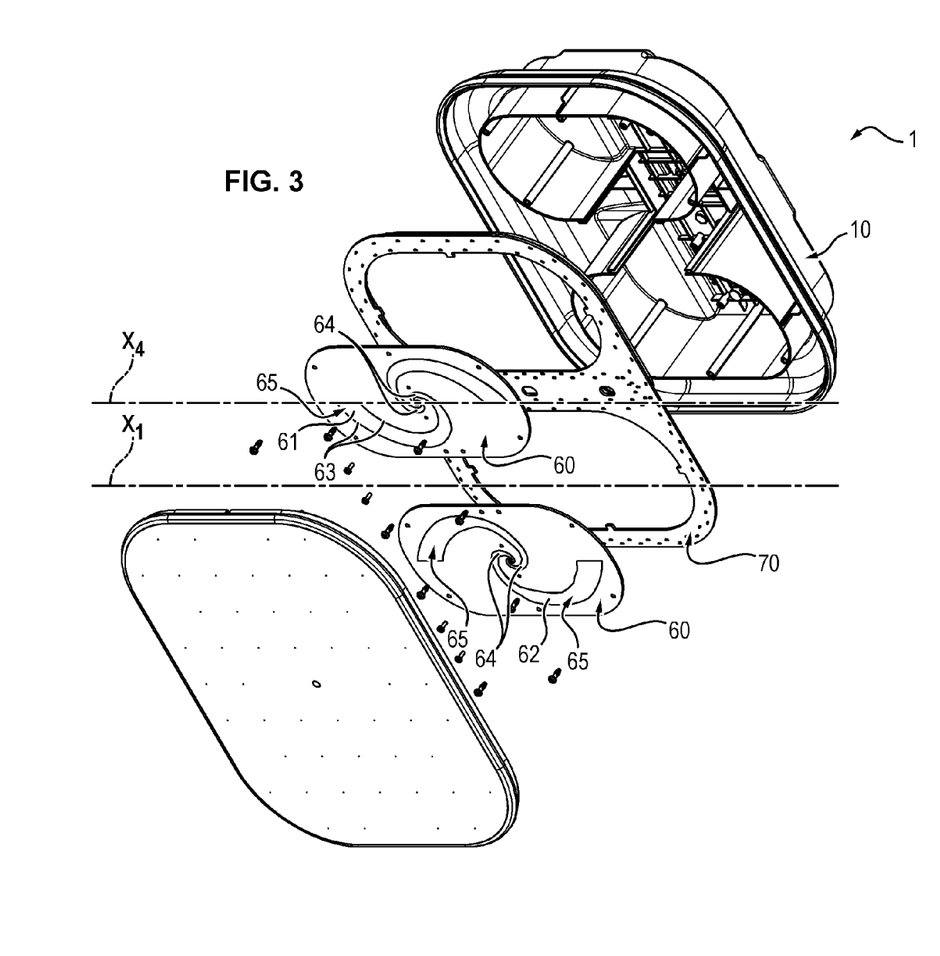
FIG. 3 is an exploded bottom view in perspective of the detector of FIG. 1.

In a first embodiment, the transmitting coil 12 and the receiving coil 13 are directly printed on the platform 11. The platform 11 and the transmitting and receiving coils 12, 13 therefore form a printed circuit. This embodiment has the advantage of reducing the compactness of the inductive sensor in the detection head 10 as well as the overall weight of the detector 1. Its cost is however substantial. Consequently, in a second embodiment, which is illustrated in FIGS. 2 and 3, the transmitting coil 12 and the receiving coil 13 may comprise wound wires, the transmitting coil 12 having a greater number of turns than the receiving coil 13.

The mechanical link 30 may comprise a built-in, pivot or ball-joint type link. Preferably, the mechanical link 30 is fixed in rotation about a third axis $X_3$ which is comprised in the plane $P_1$ and is perpendicular to the first axis $X_1$. By blocking the rotation about the third axis $X_3$, the operator is encouraged to grasp the detector 1 so that the coupling area 14 is substantially parallel to the scanning axis $X_0$ during a detection sequence.

Optionally, the detector 1 further comprises means 40 for the gripping of the detector 1 by an operator. Usually, the gripping means 40 may comprise a hoop 41 configured to slidably receive the operator's arm and a grip 42 configured to be grasped by the operator.

In one embodiment, the grip 42 extends in the plane $P_1$ in order to structurally force the operator to position the detector 1 so that the coupling area 14 is oriented so as to extend substantially parallel to the scanning axis $X_0$ during a detection sequence.

The handle 20 can be telescopic and/or comprise several distinct portions configured to be assembled with each other before being fixed together, for example by screwing.

In a manner known per se, the detector 1 also comprises processing means 50 comprising in particular a microprocessor configured to process the signal detected by the inductive sensor 12, 13, such as one or more electronic cards, a memory and when appropriate alert means and/or a display device 51.

The processing means 50 can be housed in whole or in part at the gripping means 40.

FIGS. 5a to 10b illustrate a first series of comparative tests carried out on the one hand with a traditional detector 1 (Figures Ya, Y∈[5; 12]), that is to say a dual detector 1 comprising an inductive sensor having a transmitting coil and a receiving coil overlapping each other but in which the coupling area extends perpendicularly to the scanning axis $X_0$, and on the other hand a detector 1 according to the invention (Figures Yb, Y∈[5; 12]), that is to say wherein the axis $X_1$ of the transmitting coil 12 and of the receiving coil 13 is parallel to the scanning axis $X_0$.

These tests were carried out on a magnetic ground. In a first case (FIGS. 5a, 5b, 8a and 8b), a steel ball with a diameter of 6.5 mm was placed on the magnetic ground. In a second case (FIGS. 6a, 6b, 9a and 9b), a LI-11 type detonator simulator was buried in the magnetic ground. In a third case (FIGS. 7a, 7b, 10a and 10b), a PMA-2 type detonator simulator was buried in the magnetic ground.

The detection head 10 has been passed along a right/left scanning motion according to the motion recommended to the operators in the field. By right/left scanning motion, it will be understood here a lateral motion, that is to say along a scanning axis $X_0$ which is perpendicular to the plane $P_1$ in which the handle 20 extends.

In this first series of tests, during the scanning motion, the detection head 10 is placed in contact with the ground (0 cm—FIGS. 5a to 7b) then at 5 cm from the ground (FIGS. 8a to 10b). The intensity of the detection signal was recorded with each scanning motion (from right to left).

The results of the measurements carried out for the three cases, with the traditional detector and the detector 1 according to the invention, at 0 cm and 5 cm, are summarized in the table below:

TABLE 1

| | Traditional detector Amplitude of the signal | | | Detector 1 of the invention Amplitude of the signal | | | Improvement |
|---|---|---|---|---|---|---|---|
| | At 0 cm | At 5 cm | Ratio | At 0 cm | At 5 cm | Ratio | |
| Case 1: Sphere | 15 V | 1.2 V | 12.5 | 1.7 V | 0.35 V | 4.8 | 260% |
| Case 2: LI-11 | 13 V | 1.6 V | 8.1 | 2.1 V | 1.00 V | 2.1 | 385% |
| Case 3: PMA-2 | 4.5 V | 1.3 V | 3.5 | 0.65 V | 0.7 V | 0.9 | 388% |

It therefore appears from this series of comparative tests that by modifying the orientation of the transmitting coil 12 and of the receiving coil 13 relative to the scanning axis $X_0$, the ratio between the amplitude of the signal at 0 cm (in contact with the ground) and at 5 cm from the ground is significantly decreased. In other words, the influence of the ground type and of the metal debris or comprising oxides laid on the ground is significantly decreased when the scanning direction is parallel to the first axis $X_1$ (and therefore to the longitudinal direction of the coupling area 14).

This configuration therefore makes it possible to significantly increase the detection sensitivity of the detector 1 according to the invention, since the type of ground and any debris have less influence on the detection and therefore generate fewer false alarms.

FIGS. 11a, 11b, 12a and 12b illustrate a second series of comparative tests showing the impact of this configuration on the false alarms due to the non uniformity of the ground and/or to the poor scanning motions carried out by the operators.

Figure 12A:
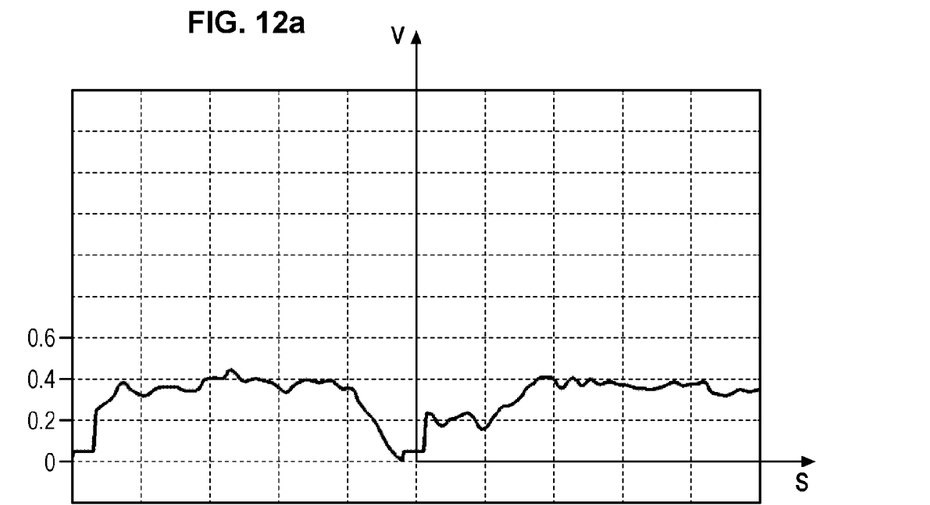
FIGS. 12a and 12b illustrate the amplitude of the signal measured for the traditional detector and the detector according to the invention, respectively, when the detector is at 5 cm from the magnetic ground and when the detector is tilted sideways by 20° and follows a right/left scanning motion.
Figure 12B:
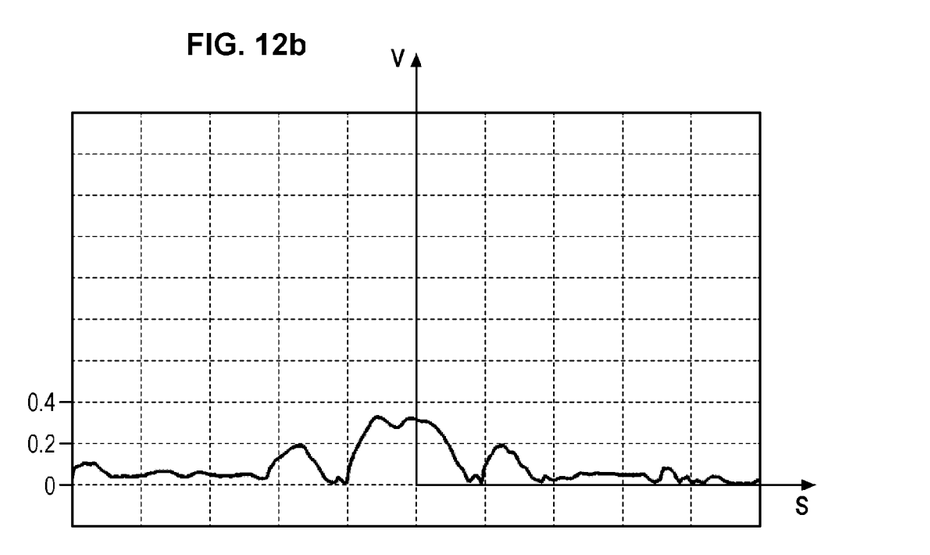

During this second series of tests, the detection head 10 of the traditional detector and of the detector 1 of the invention was passed over the magnetic ground, at 5 cm from the ground. The gain of the two detectors was equalized such that they provide the same intensity for the same gain. However, in a first case, the detection head 10 was tilted at an angle of 20° relative to the ground, statically (no scanning motion—FIGS. 11a and 11b) and in a second case the detection head 10 was tilted at this angle by 20° relative to the ground by performing the same right/left scanning motion as for the first series of tests (FIGS. 12a and 12b). It will be noted that with this angle of 20°, for the traditional detector, one among the transmitting coil 12 and the receiving coil 13 was more distant from the ground than the other, while for the detector 1 of the invention, the two coils were similarly tilted relative to the ground but each had a portion closer to the ground and a portion further away from the ground.

The results of the measurements carried out for the two cases, with the traditional detector and the detector 1 according to the invention, are summarized in the table below:

TABLE 2

|  | Traditional detector Amplitude of the signal | Detector 1 of the invention Amplitude of the signal | Improvement |
| --- | --- | --- | --- |
| Case 1: Inclination of 20° statically | 350 mV | 200 mV | 175% |
| Case 2: Inclination of 20° dynamically | 400 mV | 250 mV | 160% |

It appears from this second series of comparative tests that by modifying the orientation of the transmitting coil 12 and of the receiving coil 13 relative to the scanning axis $X_0$, there is a significant decrease in the amplitude of the signal resulting from the simple inclination of the detector 1. Indeed, in the case of the traditional detector, the difference in amplitude of the signal due to the simple inclination, statically, of the detection head, is of 350 mV, against 200 mV in the case of the detector 1 of the invention. Similarly, the amplitude of the signal due to the simple scanning with inclination is of 400 mV for the traditional detector, against 250 mV for the detector 1 of the invention.

The detector 1 comprises an additional sensor, preferably a ground-penetration radar 60.

In this case, the radar 60 comprises a transmitting antenna 61 and a receiving antenna 62 configured to transmit and receive electromagnetic waves in the ground, for example at a frequency comprised between 100 MHz and 8 GHz. When these waves encounter medium changes, part of the waves is returned to the surface and recorded by the receiving antenna 62.

Advantageously, thanks to the orientation of the transmitting and receiving coils 12, 13 relative to the scanning axis $X_0$, the surface available within each of the loops is greater. The transmitting antenna 61 and the receiving antenna 62 can therefore each be housed in the center of one of the loops of the transmitting coil 12 and of the receiving coil 13. In this way, the maximum sensitivity of the radar 60 is in the same area as the maximum sensitivity of the inductive sensor, that is to say at the coupling area 14. In other words, the microwave detection lobes of the radar 60 and the magnetic detection lobes of the inductive sensor match, so that it becomes possible for an operator to consider that the detection of a target takes place in the central area of the detection head 10 during pointing.

The loops of the transmitting coil 12 and of the receiving coil 13 having an elongated shape, the transmitting and receiving 12, 13 antennas 61, 62 can be elongated along a fourth axis $X_4$ parallel to the second axis $X_2$ in order to maximize the radiation surface and therefore the transmission capacity. For example, the transmitting antenna 61 and the receiving antenna 62 can have the shape of a logarithmic spiral which has been lengthened in order to maximize the radiation surface and the gain of the antennas while minimizing the length of each strand 63 forming the spiral of the antennas 61, 62 so as not to increase the pulse. In an elongated logarithmic spiral antenna, the spacing between the strands 63 of the spiral is indeed greater and increases logarithmically.

For example, the elongated logarithmic spiral forming the antennas 61, 62 can have a height of about 150 mm for 80 mm.

As a variant, the transmitting antenna 61 and the receiving antenna 62 of the radar 60 can be of one of the following types: quad-ridged horn radio antenna, bow tie antenna, rectangular bow tie antenna, Archimedean spiral antenna, logarithmic spiral antenna, Vivaldi antenna.

In a manner known per se, the transmitting antenna 61 and the receiving antenna 62 can be made of copper, which is a good electrical conductor.

However, in order to reduce the risks of oxidation of the antennas, the transmitting and receiving 12, 13 antennas 61, 62 can be partly made of nickel and/or chromium and partly made of copper. Nickel and chromium indeed have the advantage of not oxidizing over time while being electrically conductive.

For example, the center 64 of each antenna 61, 62 can be made of copper and protected by a layer comprising gold, while the rest 65 of the antennas 61, 26 is made of nickel and/or chromium. Between the central portion of each antenna 61, 26 and the rest of the antenna 61, 62 can be made of copper and covered with a layer of nickel (and/or chromium).

Furthermore, in order to limit the interactions with the transmitting and receiving coils 12, 13, a thickness of the transmitting antenna 61 and of the receiving antenna 62 is smaller than a depth of absorption of the coils 12, 13. In this way, the antennas 61, 62 become invisible to the magnetic field of the inductive sensor. It will however be noted that the thickness of the transmitting and receiving antennas 12, 13 must remain greater than a threshold thickness to guarantee sufficient mechanical robustness of the antennas 61, 62 and avoid any risk of breakage. The thickness of the transmitting and receiving antennas 61, 62 is therefore chosen so as to be comprised between a hundred nanometers and a micron. For example, the transmitting antenna 61 and the receiving antenna 62 may have a thickness on the order of 200 nm (to within 10%).

In order to produce antennas 61, 62 of this thickness, it is possible in particular to use a Physical Vapor Deposition (PVD) technique. This technique indeed makes it possible to obtain antennas 61, 62 of very small thickness with high dimensional accuracy and to produce several antennas at a time.

The invention claimed is:

1. A detection method comprising the following steps:
positioning a dual detector substantially parallel to a ground to be inspected, wherein the dual detector includes an inductive sensor comprising a transmitting coil and a receiving coil distinct from each other, so that the transmitting coil and the receiving coil are at a substantially equal distance from the ground, the transmitting coil and the receiving coil each forming a loop, the loop of the transmitting coil at least partially overlapping the loop of the receiving coil so as to form a coupling area, the coupling area being elongated along a longitudinal direction defining an axis; and
moving the dual detector along a scanning direction extending along a scanning axis, wherein the scanning axis is substantially parallel to the axis of the coupling area when an operator is moving the dual detector.

2. A dual detector comprising:
a detection head including:
a platform; and
an inductive sensor fixed to the platform and comprising a transmitting coil and a receiving coil distinct from each other, the transmitting coil and the receiving coil each forming a loop, the loop of the transmitting coil at least partially overlapping the loop of the receiving coil so as to form a coupling area, the coupling area being elongated along a first longitudinal direction defining an axis; and
a handle connected to the detection head, wherein the handle extends in a plane which is normal to the platform and transverse to the axis of the coupling area.

3. The dual detector according to claim 2, wherein the loop of the transmitting coil and the loop of the receiving coil are elongated along a second longitudinal direction defining an additional axis, the axis of the coupling area and the additional axis being substantially parallel.

4. The dual detector according to claim 2, wherein the detection head is elongated and extends along the axis of the coupling area.

5. The dual detector according to claim 2, wherein the transmitting coil and the receiving coil comprise wound wires, the wound wires of the transmitting coil having a greater number of turns than the wound wires of the receiving coil.

6. The dual detector according to claim 2, wherein the transmitting coil and the receiving coil are directly printed on the platform so as to form a printed circuit.

7. The dual detector according to claim 2, wherein the transmitting coil and the receiving coil are homopolar.

8. The dual detector according to claim 2, further comprising a mechanical link configured to connect the detection head to the handle, wherein the mechanical link is fixed in rotation about an additional axis, said additional axis being comprised in the plane.

9. The dual detector according to claim 8, wherein the additional axis is transverse to the axis of the coupling area.

10. The dual detector according to claim 8, wherein the mechanical link comprises a pivot link, a built-in link or a ball-joint link.

11. The dual detector according to claim 2, further comprising a grip configured to be grasped by an operator, said grip extending in the plane.

12. The dual detector according to claim 2, further comprising a ground-penetration radar comprising a transmitting antenna and a receiving antenna, the transmitting antenna and the receiving antenna each being housed in a center of one of the loops of the transmitting coil and the receiving coil.

13. The dual detector according to claim 12, wherein the transmitting antenna and the receiving antenna of the ground-penetration radar are of one of the following types: quad-ridged horn radio antenna, bow tie antenna, rectangular bow tie antenna, Archimedean spiral antenna, logarithmic spiral antenna, Vivaldi antenna, logarithmic spiral antenna elongated along an additional axis perpendicular to first axis of the coupling area.

14. The dual detector according to claim 12, wherein the transmitting antenna and the receiving antenna are made at least partly of nickel or chromium.

15. The dual detector according to claim 14, wherein a central portion of the transmitting antenna and of the receiving antenna is made of copper and comprises, on a surface, a protective layer made of gold.

16. The dual detector according to claim 12, wherein the transmitting antenna and the receiving antenna have a thickness less than one micron.

17. The detection method of claim 1, wherein the inductive sensor extends in a plane and wherein, during the positioning step, the dual detector is positioned such that the plane is at a substantially equal distance from the ground to be inspected.

18. The dual detector according to claim 12, wherein the transmitting antenna and the receiving antenna have a thickness equal to about 200 nm.

19. A detection method comprising the following steps:
positioning a dual detector substantially parallel to a ground to be inspected, wherein the dual detector includes an inductive sensor comprising a transmitting coil and a receiving coil distinct from each other, so that the transmitting coil and the receiving coil are at a substantially equal distance from the ground, the transmitting coil and the receiving coil each forming a loop, the loop of the transmitting coil comprising a first portion that overlaps the loop of the receiving coil so as to form a coupling area and a second portion that uncovers the loop of the receiving coil, the coupling area being elongated along a longitudinal direction defining an axis; and
moving the dual detector along a scanning direction extending along a scanning axis, wherein the scanning axis is substantially parallel to the axis of the coupling area when an operator is moving the dual detector.

\* \* \* \* \*